United States Patent Office 2,742,365
Patented Apr. 17, 1956

2,742,365

ENZYMATIC PREPARATION OF HIGH LEVULOSE FOOD ADDITIVES

Julian Corman, Henry M. Tsuchiya, and Charles S. Stringer, Peoria, Ill., assignors to the United States of America as represented by the Secretary of Agriculture No Drawing. Application August 18, 1954, Serial No. 450,825

6 Claims. (Cl. 99—134)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to high viscosity sweet sirups for use in various food applications and to a method for making them. It relates more particularly to a composition of matter, a food additive comprising a carbohydrate gum such as dextran, levulose and water which has the combined properties of being sufficiently viscous to impart desirable consistency to foods as well as enhanced sweetness, which is essentially free from proteinaceous material and protein degradation substances.

The novel composition of this invention is essentially an aqueous solution of dextran and levulose in water, the quantity of water being widely variable and the quantity of the other two constituents, although variable, nevertheless confined to certain desirable limits while the quantity of levulose approximates that of the dextran present as will appear from the following description of the invention. The composition is distinguished from prior sirup compositions containing dextran by its greatly increased purity as well as its enhanced sweetness due to high levulose content. It is further distinguished from such prior compositions by its essential freedom from contamination and undesirable taste and odor constituents.

Our novel food additive possesses the desirable characteristics noted in the foregoing paragraph, mainly by virtue of our novel method for its preparation. Prior methods for the production of high viscosity gum-containing sirups, as for example that described in United States Patent No. 2,409,816, involve the partial fermentation of sugars by a dextran-forming microorganism such as *Leuconostoc mesenteroides*. The microorganism is cultivated in a sucrose solution containing constituents which are essential and desirable for the growth of the organism. This culture medium is then heat inactivated after the production of dextran has proceeded to such a point that desirable viscosities of the medium have been achieved. The result is a viscous sirup-like product possessing some sweetness due to unfermented sucrose and unassimilated levulose. The latter appears as a by-product of the conversion of sucrose into dextran. The viscous product possesses sufficient viscosity to be useful in food compositions but has the disadvantage of disagreeable odor and flavor. It also lacks adequate sweetness for many of the uses to which viscous, sirup-like substances, would normally be put.

Our product is particularly useful in imparting desirable consistency to candies, frozen desserts, liquid foods or beverages, and similar food products. It may be used in many sugar-containing foods, particularly liquid or semi-liquid compositions to prevent the undesired crystallization of sucrose. Its function as a crystallization inhibitor in such compositions is particularly effective owing to the presence of the carbohydrate gum and the levulose, each of which prevent sucrose crystallization.

In preparing our novel additive we take advantage of the fact that the conversion of sucrose to dextran is essentially an enzymolysis. Theoretically the course of reaction is as follows:

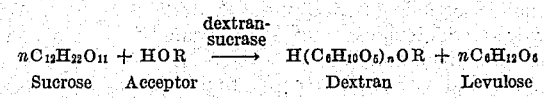

We believe this to be true whether or not the dextran is produced directly by microorganisms in a whole culture process such as that of the aforementioned patent or by means of an isolated dextransucrase enzyme system. The latter method for producing dextran has been described in the literature and is known to possess various technological advantages for producing dextran. According to those prior methods, the conversion is carried out by acting with dextransucrase upon an aqueous solution of sucrose. The conditions of the conversion vary in accordance with the desired results. Thus, the concentration of sucrose solution may vary over rather wide limits, and the pH of the conversion liquor may be adjusted to various values in accordance with the effects and results desired. The conversion to dextran by dextransucrase has heretofore been followed by precipitation of the dextran by means of such precipitants as methanol, ethanol, and the like. The precipitated dextran is then treated as desired, i. e. fractionated, hydrolyzed, etc.

Even though the conversion of sucrose to dextran may follow the theoretical course shown above, there is a vast difference in overall conditions and results depending upon the presence or absence of the dextransucrase-producing bacteria. In their presence the system of dextran synthesis is in fact a life process. Its life process depends upon levulose, i. e. the portion of the sucrose molecule which is complementary with the anhydrodextrose molecule. As it thrives in the system, the microorganism utilizes levulose as its primary source of assimilable carbohydrate. Thus, the system containing the microorganism is continually being depleted of its levulose content. On the other hand in the purely enzymic system the levulose is not assimulated but remains unaltered in the solution. As a consequence on a weight basis the quantity of levulose is approximately equal to the quantity of gum dextran produced.

The dextransucrase employed in the production of dextran as noted in the foregoing paragraph may be obtained by known methods (patent Ser. No. 256,586 application) and is customarily used in the form of a culture filtrate obtained directly from the production step. Suggestions have been made of methods for isolating dextransucrase and purifying it, but these methods have not been utilized as a practical matter, since use of the whole culture filtrate has heretofore proved satisfactory for dextran production.

The production of dextran by use of dextransucrase that has been separated from the bacterial cells is known to produce levulose as a by-product. Suggestions have been made of the recovery of levulose as a by-product of the enzyme synthesis of dextran. In that particular synthesis it appears that levulose occurs in almost theoretical amounts in accordance with the equation depicted above, and furthermore the absence of large quantities of extraneous contaminants renders the by-product liquors from which dextran has been precipitated adaptable to the recovery of levulose.

In accordance with this invention we produce an aqueous solution of dextran and accompanying levulose by enzyme synthesis which may be used directly for food purposes. As may be readily understood, our sirup-like product differs from prior such products by possessing relatively larger proportions of levulose. Actually the amount of levulose present renders the sweetness of our sirups almost equivalent to the original sweetness of the unconverted sucrose solution. Thus, by the process of our invention, we are able to produce a desirable viscous product from a sucrose solution without substantially reducing its sweetening capacity and at the same time without introducing disagreeable odors or flavors. This is true because our products contain essentially the theoretical proportion of dextran and levulose that are indicated in the reaction equation given above.

Our findings, particularly as to sweetening power, are borne out by previous data given by others on the relative sweetness of levulose compared with sucrose. Simple calculation from these data confirm our findings. Thus, in our products approximately 52.6 percent of any given weight quantity of sucrose will occur theoretically as levulose. Yet the greater sweetening power of levulose is such that the resulting sweetness which remains is almost equal to that of the original sucrose.

We prepare our product by employing dextrasucrase as previously mentioned. The purity of our sirups may be controlled within surprisingly exact limits by selecting dextransucrase of the desirable state of purity. Use of the enzyme in a culture liquor from which the bacterial cells have been centrifuged results in a sirup which is satisfactorily pure for most food purposes. The purity may be increased, however, by further purification of the enzyme. For example, the enzyme liquor from which the cells have been removed as by centrifugation may be adjusted to a pH range suitable for precipitation of proteinaceous material. The adjustment of pH may take place simultaneously with the removal of bacterial cells, or the additional purification may be carried out as a separate subsequent step. The particular manner in which to effect coagulation of protein by pH adjustment will vary with the character of the medium, the latter being mainly dependent upon the type of proteinaceous nutrient supplied the microorganism in the enzyme synthesis step. As will occur to those skilled in the art, it may mean the addition of either acid or alkali, usually alkali. Generally, coagulation will occur within a pH of 4 to 10, depending upon the above factors. In the case of the synthesis medium in which corn steeping liquor has been used, we have found that coagulation is accomplished at a pH of around 7.

Another method of gain increased purity of product is to dilute the enzyme solution during or before the conversion. This tends to prolong the conversion time to some extent, but the minimization of off-flavor and odor is quite appreciable.

Further purity of product may be gained by precipitating the enzyme before conversion by means of solvents or salts. The enzyme may be concentrated and rendered suitable for storage by lyophylization of a solution of the alcohol precipitated enzyme. Such lyophylization results in a white fluffy powder that is absolutely odorless and tasteless. The sirups produced by such a purified enzyme are water clear.

The following examples illustrate the invention. The data have been selected to illustrate specific aspects of the invention, particularly those phases which distinguish it from prior processes for making dextran-containing food sirups. The enhanced purity of our products is demonstrable principally by their freedom from disagreeable odor and flavor. The enhanced sweetness is evident from the sugar analyses which indicate nearly the theoretical quantity of levulose derivable from the sucrose consumed in the process.

Illustrated also in the following examples is the remarkable range of control over product composition which is possible by the process of our invention. We may, for example, produce a sirup of a given viscosity containing relatively high proportion of sucrose compared with levulose or a sirup containing practically no sucrose and deriving all its sweetness from its levulose content. The viscosity may be varied from a sirup having a relatively low body to a gel by varying either of five factors, each of which is illustrated below. It may readily be seen that viscosity control is also possible by a combination of any or all of the five factors. The first viscosity control factor is concentration of sucrose which may vary up to 35 percent or higher without the introduction of any biological difficulty previously experienced in whole culture methods of sirup manufacture. Viscosity may be controlled (2) by the time factor for a given sucrose and enzyme concentration. Viscosity may also be controlled (3) by the utilization of the additional enzyme, dextranase, operating either simultaneously with dextransucrase or subsequent thereto. The effect of dextranase is to reduce the size of the dextran molecule, thus lowering the viscosity of the resulting sirup. Using this latter method, we have found it possible to produce a sirup containing a relatively large amount of dextran, yet which possesses a viscosity that is considerably lower than prior sirups of the same dextran content. By virtue of the correspondingly increased levulose content, these sirups possess remarkable sweetening properties. Viscosity may be controlled (4) by additional purification of the dextransucrase enzyme from *Leuconostoc mesenteroides* culture filtrates. Viscosity of the finished sirup may also be controlled (5) by temperature of incubation of the mixture of enzyme and sucrose.

Example 1, below, shows the preparation of purified dextransucrase enzyme.

Example 2 shows the effect of dextranase on the viscosity of our food additive sirups.

Example 3 shows the superior viscosity properties of our compositions prepared from purified dextransucrase.

Example 4 shows the effects of sucrose concentration and temperature on the viscosity of our sirups.

The production of the enzyme dextransucrase is known to the art and a process for its production is disclosed in patent application Serial No. 256,586, filed November 15, 1951.

(1) A culture of *Leuconostoc mesenteroides* NRRL B–512 propagated in less than 10 percent sucrose broth and containing the dextransucrase enzyme can merely be filtered or centrifuged to remove much of the bacterial cells and debris and may then be used as the enzyme source for our process.

(2) The culture containing the dextransucrase enzyme may first be adjusted to a desirable pH where most of the inert and undesirable material is coagulated and precipitated with the bacterial cells that can be removed by filtration or centrifugation. However, the pH of the culture filtrate should be readjusted to pH 5.0 to 5.5 as soon as practicable after clarification, as this is an optimal pH range for stability of the dextransucrase enzyme.

(3) After pH adjustment and clarification as described in (2) the enzyme can be precipitated from the culture filtrate with alcohol or other well known enzyme precipitants within a pH range of 4.0 to 7.0.

EXAMPLE 1

Varying quantities of cold ethanol were added to tubes containing 20 ml. aliquots of *Leuconostoc mesenteroides* NRRL B512 culture filtrate that had been cleared of proteinaceous material (from corn steep liquor) after coagulation at pH 7 and then adjusted to pH 5.2 and cooled to 34° F. After standing 16 hours at 34° F. the tubes containing ethanol and culture filtrate mixtures were centrifuged. The total enzyme potency of the precipitate (resuspended in water) as well as that remaining in the supernatant solutions was determined in each case and the data are shown in Table I.

Table I
DEXTRANSUCRASE UNITS[1] PER TUBE CONTAINING 20 ml. CULTURE FILTRATE

| Percent Ethanol Added | Dextransucrase units in supernatant | Dextransucrase units in precipitate | Dextransucrase units total |
|---|---|---|---|
| 0 (control) | 760 | 26 | 786 |
| 20 | 598 | 36 | 634 |
| 25 | 512 | 48 | 560 |
| 30 | 294 | 298 | 592 |
| 35 | 24 | 734 | 758 |
| 40 | 26 | 583 | 609 |

[1] A unit of dextransucrase is that amount of enzyme that can convert 1 milligram sucrose per hour at 30° C. and pH 5.0 to dextran and levulose.

After the enzyme has been precipitated with alcohol it may be redissolved in water and lyophylized to produce a white fluffy powder that is devoid of taste yet has an enzyme potency of 20 to 50 dextransucrase units per milligram.

EXAMPLE 2

The viscosity of sirups may be controlled by the action of dextranase, functioning either simultaneously with dextransucrase or subsequently, i. e. after the action of dextransucrase has been initiated. By definition dextranase is a dextran depolyerizing enzyme. However, when dextranase enzyme acts simultaneously with dextransucrase in a reaction mixture containing sucrose, the low molecular weight dextrans first formed by the action of the dextranase act as primers to initiate synthesis of additional low molecular weight dextrans. This, of course, is at the expense of large molecular weight dextran polymers normally produced by dextransucrase in the absence of such low molecular weight primers. Thus, the function of dextranase in altering the viscosity is to alter the structure of the dextran component of the sirup. So far as we know, it does not affect the levulose component. To illustrate one embodiment of this feature of our invention, the following experiments were carried out.

Two aliquots of a 10 percent sucrose solution containing 40 dextransucrase units per milliliter and adjusted to pH 5.0 were placed in a 30° C. water bath. The dextransucrase was added as purified enzyme obtained by alcohol precipitation of the enzyme from the culture filtrate of *L. mesenteroides*. One-tenth unit of dextranase per milliliter derived and isolated from a culture of *Penicillium funiculosum* NRRL-1768 was added to one of the flasks just prior to incubation while the second flask was left as a control. (One dextranase unit is that amount of enzyme which produces a reducing power equivalent to one milligram isomaltose per hour when incubated with a dextran solution at 40° C. and pH 5.2.) After 26 hours incubation both sirups were steamed 15 minutes and then diluted to double their original volumes. The relative viscosity of the diluted control sirup was 14.5 while the diluted sirup which contained the dextranase enzyme in addition to dextransucrase and sucrose had a relative viscosity of only 1.8.

The reducing power of the control sirup, calculated as levulose was equivalent to 103.8 percent of the levulose theoretically present in the original sucrose used. The small excess above 100 percent theoretical reducing power, calculated as levulose, may be accounted for by the presence of small quantities of glucose and oligosaccharides. We have observed the presence of small quantities of these substances in our sirups chromatographically.

The reducing power of the dextranase treated sirup of this example was approximately equal to that of the control sirup. Similar results as to relative viscosity and reducing power may be obtained by employing dextranase after the action of the dextransucrase has been initiated, or even after its action has been completed and the resulting sirup treated to inactivate the enzyme.

Although we have noted in the early stages of incubation the viscosities of our sirups generally increase as incubation time is prolonged we have not been able to obtain a stiff gel by any combination of sucrose and culture filtrates of *Leuconostoc mesenteroides* NRRL B-512 that were merely filtered prior to or after pH adjustment. However, this inability to produce a gel can be overcome by prior precipitation of the dextransucrase from the culture filtrate by means of alcohol or similar enzyme precipitant. Thus, incubation of sucrose with dextransucrase that previously had been precipitated with alcohol leads to the production of stiff gels.

EXAMPLE 3

A total concentration of 40 dextransucrase units per ml. was added to each of four solutions adjusted to pH 5.0 and made to contain 10 percent sucrose. These enzyme-sucrose mixtures which were incubated at 30° C. contained varying amounts of dextransucrase from the original *L. mesenteroides* NRRL B-512 culture filtrate and also dextransucrase that was purified by ethanol precipitation. The relative viscosities of the incubated mixtures at varying time intervals are shown in Table II.

Table II

| Type Dextransucrase | Dextransucrase units per ml. | | | |
|---|---|---|---|---|
| Culture filtrate | 0 | 13 | 27 | 40 |
| Ethanol precipitated Enzyme | 40 | 27 | 13 | 0 |

| Hrs. Incubation | Relative Viscosity | | | |
|---|---|---|---|---|
| 0 | 3.4 | 3.3 | 3.4 | 3.1 |
| 2 | 52 | 29 | 21 | 16 |
| 5 | 1,100 | 770 | 260 | 94 |
| 10 | 1,100 | 830 | 200 | 76 |
| 22 | 1,400 | 840 | 130 | 53 |

In the above experiment the superior viscosity producing properties of purified dextransucrase is shown in column 2. Actual gels may easily be obtained by increasing the sucrose concentration of the reaction mixture to above 10 percent.

EXAMPLE 4

In another series of experiments, the viscosity producing effect of purified dextransucrase was compared directly with the effect of the dextransurcase-containing culture filtrates. A culture filtrate of *Leuconostoc mesenteroides* NRRL B-512, prepared in accordance with the process application Ser. No. 256,586, was divided and a portion was cleared of proteinaceous material and precipitated with cold ethanol as in Example I. Parallel experiments were run employing varying concentrations of sucrose in which the original culture filtrate was paired with purified enzyme at the same dextransucrase level. The dextransucrase in each experiment shown in the table was present in the reaction mixture in the concentration of 40 units per ml. The experiments were carried out at 15° C. and the pH maintained at about 5.1 for a period of 23.5 hours. The series of experiments were then duplicated at 30° C. The results are given in Table III.

Table III

| Conc. Sucrose, Volume Percent | Relative Viscosity | | | |
|---|---|---|---|---|
| | 15° C. Reaction Mixtures | | 30° C. Reaction Mixtures | |
| | Culture filtrate | EtOH ppt. Enzyme Conc. | Culture filtrate | EtOH ppt. Enzyme Conc. |
| 5 | 5.6 | 120 | 5.8 | 28 |
| 10 | 17.6 | 500 | 20 | 1,800 |
| 20 | 44.6 | 1,700 | 92 | 28,000 |

An examination of Table III will show the striking difference in viscosity producing effect. It will be noted that the experiment carried out at 30° C. in a 20 percent sugar solution gave a gel with the purified enzyme whereas the culture filtrate produced a very fluid though viscous solution.

It will be noted that with the purified enzyme preparation, higher viscosity sirups were produced than those obtained by the use of culture filtrate. Use of purified enzyme preparations permits of much wider control of viscosity of the finished sirup. Further control of viscosity can be achieved, especially with purified enzyme, by varying the temperature at which the synthesis is conducted. This is especially useful if enhanced sweetening value is desired at moderate viscosity, since a synthesis at 15° C. containing 20 percent sucrose achieved a viscosity no higher than that obtained with 10 percent sucrose at 30° C. In all sirups described in Table III, the extent of the conversion of sucrose to dextran and levulose was essentially complete, so that it is evident that the differences in viscosity between otherwise identical preparations synthesized at the two temperatures is not a result of incomplete conversion.

The products prepared in the foregoing examples using enzymic synthesis methods are each superior in odor, color and flavor to the viscous sirups produced by whole culture procedure. They may readily be used as bodying agents and consistency regulators in such foodstuffs as fondant, candy, ice cream, flavored drinks such as fruit, chocolate, or other flavored milk drinks, sauces, dressings, topping, and the like. Their value as a bodying agent is enhanced by their inherent enhanced sweetness and by their ability to inhibit crystallization. For example, our sirups may be used to replace the sweetening and vegetable thickeners used in reduced fat chocolate milk drinks. They may be used to replace the vegetable thickeners used in ice cream and frozen desserts. Sugars such as dextrose or sucrose may be added to our sirups to produce high sugar sirups which are not only stable against crystallization but are also free of disagreeable odor and flavor. Other food additive uses of our products will readily occur to those skilled in the culinary arts.

We claim:

1. The method of producing a high viscosity, high levulose food additive sirup comprising subjecting an aqueous solution of sucrose to the action of dextransucrase in the substantial absence of bacterial cell material and proteinaceous material, thus to produce an aqueous solution of dextran and levulose, the quantity of levulose being approximately molecularly equivalent to the quantity of sucrose originally present.

2. In a method for producing a stabilizing addition agent for inhibiting the crystallization of sucrose comprising converting an aqueous solution of sucrose to an aqueous solution of dextran and levulose the improvement comprising carrying out the conversion with dextransucrase in the substantial absence of dextran-producing microorganism cell material and degraded proteinaceous material.

3. The method of claim 2 in which the enzyme conversion is carried out in the additional presence of dextranase.

4. The method of recovering dextransucrase in purified form from an aqueous solution containing dextransucrase together with degraded proteinaceous material which comprises coagulating said proteinaceous material by altering the pH of said solution to a value causing coagulation, removing the coagulated material and thereafter readjusting the pH to 4.0 to 5.5.

5. The method of recovering dextransucrase in purified form from an aqueous solution containing dextransucrase together with degraded proteinaceous material derived from corn steeping liquor which comprises coagulating said proteinaceous material by altering the pH of said solution to a value causing coagulation, removing the thus coagulated material and readjusting the solution to pH 5.0 to 5.5.

6. Method of claim 5 in which the dextransucrase is precipitated from said readjusted solution by the addition of ethanol.

References Cited in the file of this patent

UNITED STATES PATENTS

| | | |
|---|---|---|
| 1,616,170 | Arsen | Feb. 1, 1927 |
| 2,089,217 | Mahoney | Aug. 10, 1937 |
| 2,392,258 | Owen | Jan. 1, 1946 |
| 2,409,816 | Wadsworth | Oct. 22, 1946 |
| 2,660,551 | Koepsell | Nov. 24, 1953 |
| 2,673,828 | Koepsell | Mar. 30, 1954 |
| 2,686,147 | Tsuchiya et al. | Aug. 10, 1954 |
| 2,709,150 | Carlson | May 24, 1955 |

FOREIGN PATENTS

| | | |
|---|---|---|
| 675,025 | Great Britain | July 2, 1952 |

OTHER REFERENCES

Stacey: Nature, 3788, June 6, 1942, page 639.

Koepsell et al.: Jour. Bact., 63, 2, February 1952, pages 293 to 295.

Bixler et al.: I. & E. Chem. 45, 4, April 1953, page 704.

Nature: February 6, 1954, page 237.